United States Patent
Mills et al.

(10) Patent No.: US 9,125,521 B2
(45) Date of Patent: Sep. 8, 2015

(54) COMBINED MULTIPLE BEVERAGE BREWING APPARATUS AND BREWING BASKET FOR USE IN SAME

(71) Applicant: Brookstone Purchasing, Inc., Merrimack, NH (US)

(72) Inventors: Stephen B. Mills, Atkinson, NH (US); Jacob Saffron, Merrimack, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 0 days.

(21) Appl. No.: 14/333,794

(22) Filed: Jul. 17, 2014

(65) Prior Publication Data

US 2015/0182063 A1    Jul. 2, 2015

Related U.S. Application Data

(60) Provisional application No. 61/923,167, filed on Jan. 2, 2014.

(51) Int. Cl.
| | |
|---|---|
| *A47J 31/40* | (2006.01) |
| *A47J 31/44* | (2006.01) |
| *A47J 31/06* | (2006.01) |
| *A47J 31/02* | (2006.01) |
| *A47J 31/46* | (2006.01) |
| *A47J 31/52* | (2006.01) |

(52) U.S. Cl.
CPC *A47J 31/46* (2013.01); *A47J 31/40* (2013.01); *A47J 31/52* (2013.01)

(58) Field of Classification Search
CPC .......... A47J 31/00; A47J 31/40; A47J 31/44; A47J 31/06; A47J 31/02
USPC .......... 99/275, 279, 280, 281, 282, 283, 284, 99/285, 286, 287, 288, 289, 290, 291, 298, 99/300, 316, 323, 299, 302 R, 306, 304
See application file for complete search history.

(56) References Cited

U.S. PATENT DOCUMENTS

| | | | | |
|---|---|---|---|---|
| 2,702,000 | A | * | 2/1955 | Renner .......................... 99/303 |
| 3,149,556 | A | * | 9/1964 | Martin .......................... 99/291 |

(Continued)

OTHER PUBLICATIONS

PCT International Search Report and Written Opinion mailed Nov. 6, 2014, received in corresponding PCT Patent Application No. PCT/US14/61339, 9 pgs.

*Primary Examiner* — Dana Ross
*Assistant Examiner* — Michael Laflame, Jr.
(74) *Attorney, Agent, or Firm* — Grossman Tucker Perreault & Pfleger, PLLC

(57) ABSTRACT

A combined multiple beverage brewing apparatus is capable of brewing an individual serving of at least two different beverages such as coffee or tea. The apparatus generally includes a removable brewing basket with separate brewing sections, which are usable in different brewing positions and have separate spouts such that different beverages may be brewed and dispensed without contacting the same spout. The brewing basket is configured to receive a first reusable filter that holds a first brewing material and filters as water passes through and a second reusable filter that holds a second brewing material while hot water contained in the brewing basket steeps the second brewing material. At least one of the brewing sections further includes a valve to hold hot water in the brewing basket until a brewing release mechanism actuates the valve to release the brewed beverage through the dispensing spout.

16 Claims, 9 Drawing Sheets

(56) References Cited

U.S. PATENT DOCUMENTS

| | | | |
|---|---|---|---|
| 4,757,754 A * | 7/1988 | Welker | 99/307 |
| 5,265,518 A * | 11/1993 | Reese et al. | 99/280 |
| 5,855,163 A * | 1/1999 | DeMars | 219/448.17 |
| RE37,173 E * | 5/2001 | Jefferson et al. | 99/299 |
| 6,237,811 B1 * | 5/2001 | Ford | 222/129.1 |
| 6,474,221 B2 * | 11/2002 | Shaanan et al. | 99/289 R |
| 7,021,197 B2 * | 4/2006 | Chen et al. | 99/291 |
| 2003/0066431 A1 * | 4/2003 | Fanzutti et al. | 99/279 |
| 2006/0278091 A1 | 12/2006 | Rutigliano | |
| 2007/0295220 A1 | 12/2007 | Webster et al. | |
| 2009/0178569 A1 | 7/2009 | Tucker et al. | |
| 2010/0154645 A1 * | 6/2010 | Nosler et al. | 99/281 |
| 2011/0070348 A1 * | 3/2011 | Burton-Wilcock et al. | 426/431 |
| 2011/0200726 A1 * | 8/2011 | Tinkler et al. | 426/431 |
| 2012/0107463 A1 * | 5/2012 | Santoiemmo | 426/232 |
| 2013/0062366 A1 * | 3/2013 | Tansey | 222/102 |
| 2013/0199378 A1 * | 8/2013 | Yoakim et al. | 99/283 |
| 2014/0290493 A1 * | 10/2014 | Rivera | 99/285 |

* cited by examiner

COMBINED MULTIPLE BEVERAGE BREWING APPARATUS AND BREWING BASKET FOR USE IN SAME

CROSS-REFERENCE TO RELATED APPLICATIONS

This application claims the benefit of U.S. Provisional Patent Application Ser. No. 61/923,167 filed on Jan. 2, 2014, which is fully incorporated herein by reference.

TECHNICAL FIELD

The present invention relates to brewing beverages and more particularly, to a combined multiple beverage brewing apparatus for brewing different types of beverages such as coffee and tea.

BACKGROUND INFORMATION

Individual serving coffee and tea brewing systems have become increasingly popular. The Keurig K-Cup® Brewing System, for example, uses pre-packaged disposable cups containing coffee grinds or tea leaves to brew single servings of coffee or tea. Although these systems are effective, there may be concerns with the waste generated by the disposable cups. Also, the use of the pre-packaged cups prevents the user from selecting and using freshly ground coffee or fresh tea leaves.

Attempts at using a single device for coffee and tea brewing have also presented challenges, for example, because of the different brewing processes involved. Coffee may be brewed by passing hot water continuously through the coffee grinds, while tea generally is brewed by steeping the tea leaves in hot water. Also, the use of the same spout to dispense coffee and tea may result in undesirable mixing of the coffee and tea flavors.

BRIEF DESCRIPTION OF THE DRAWINGS

These and other features and advantages will be better understood by reading the following detailed description, taken together with the drawings wherein.

DETAILED DESCRIPTION

Figure 1:
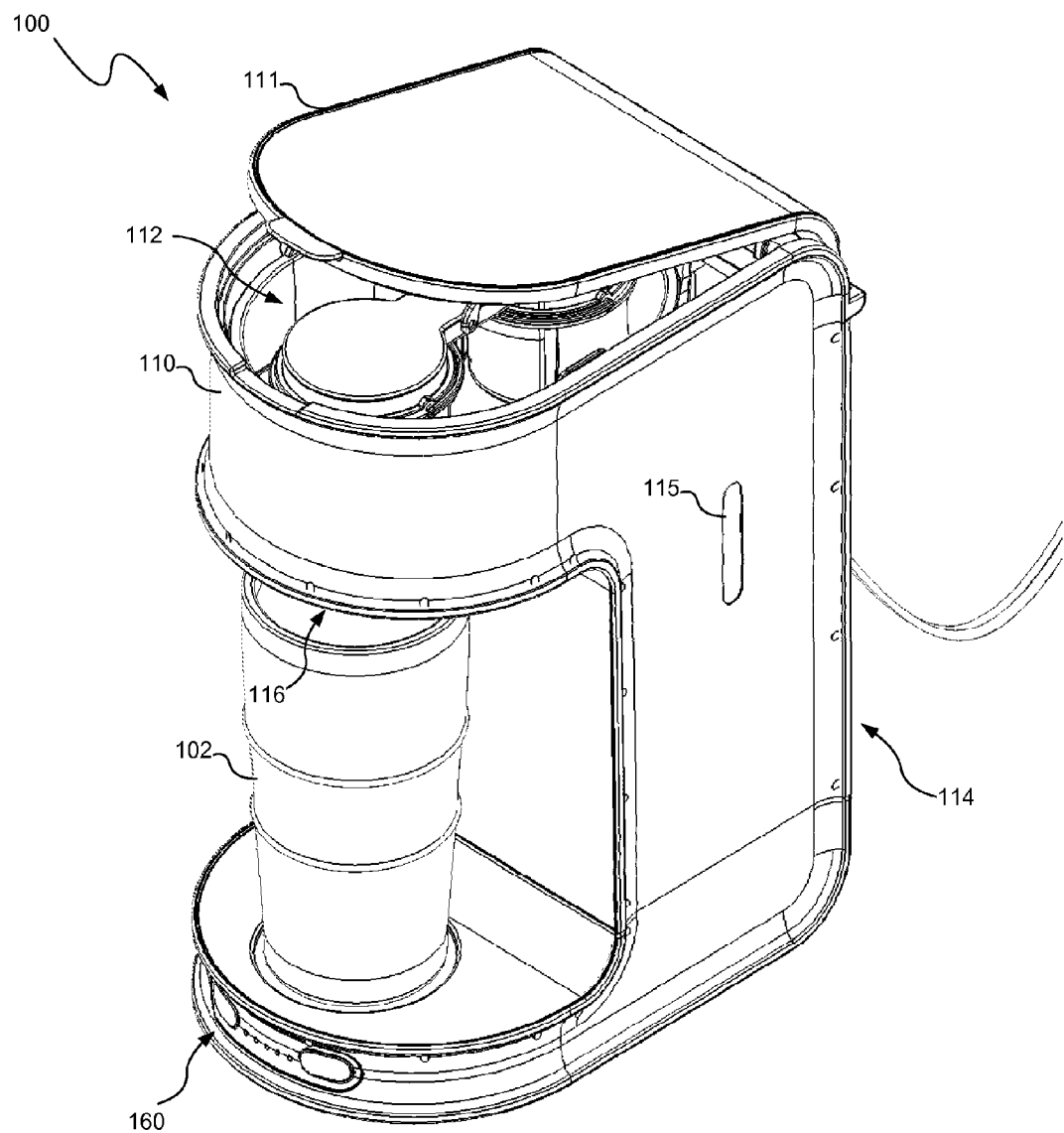
FIG. 1 is a perspective view of a combined coffee and tea brewing apparatus, consistent with an embodiment of the present disclosure.

A combined multiple beverage brewing apparatus, consistent with the present disclosure, is capable of brewing an individual serving of at least two different beverages such as coffee or tea. The combined multiple beverage brewing apparatus generally includes a removable brewing basket with separate brewing sections, which are usable in different brewing positions and have separate spouts such that different beverages (e.g., coffee and tea) may be brewed and dispensed without contacting the same spout. The brewing basket is configured to receive a first reusable filter that holds a first brewing material (e.g., coffee grinds) and filters as water passes through and a second reusable filter that holds a second brewing material (e.g., tea leaves) while hot water contained in the brewing basket steeps the second brewing material. At least one of the brewing sections further includes a valve to hold hot water in the brewing basket until a brewing release mechanism actuates the valve to release the brewed beverage through the dispensing spout.

The present disclosure describes an example embodiment of a combined coffee and tea brewing apparatus. The example embodiment of the apparatus described herein may also be used to brew other varieties and combinations of multiple beverages, for example, multiple different types of teas, multiple different types of coffees, and/or other brewed beverages including, without limitation, hot cocoa, chai, cider, and iced beverages. As used herein, "brewed beverage" includes any beverage formed by passing hot water through a material that imparts flavor to the water. The example embodiment of the apparatus described herein may also be used to brew more than two different types of beverages. The brewing basket may be designed, for example, with more than two brewing sections. Although the example embodiment is described as brewing a single serving (e.g., about 6-12 fluid ounces), a multiple beverage brewing apparatus may also be used to brew larger sizes including multiple servings of a brewed beverage.

Referring to FIGS. 1-5, an embodiment of a combined coffee and tea brewing apparatus 100 is shown and described in greater detail. The combined coffee and tea brewing apparatus 100 is designed to receive a container 102, such as a portable mug with a lid, and to fill the container 102 with an individual serving of coffee or tea. Although one embodiment is shown and described herein, other embodiments are within the scope of the present disclosure and may have other shapes and configurations. In other embodiments, for example, the container 102 may be a carafe or container larger than a single serving.

The combined coffee and tea brewing apparatus 100 includes a housing 110 defining a brewing region 112, a hot water delivery region 114, and a dispensing region 116. The housing 110 encloses a coffee and tea brewing basket 120 (FIGS. 2 and 3) in the brewing region 112 for brewing the coffee or tea and a hot water delivery system 140 (FIG. 3) in the hot water delivery region 114 for delivering hot water to the coffee and tea brewing basket 120. The housing 110 further includes a hinged lid 111 covering the brewing region

112. The hinged lid 111 is opened to access the brewing region 112 and to fill the apparatus 100 with water and is closed during the brewing process. In the illustrated embodiment, the hinged lid 111 includes an arcuate region 113 (FIGS. 2 and 3) proximate the hinge to facilitate flow of condensation back into the housing 110 after the brewing operation.

The housing 110 also includes a water level window 115 that indicates a level of the water contained within the housing 110. A user interface 160 located on the housing 110 allows the user to select coffee brewing or tea brewing and to start and stop the brewing process. The user interface 160 may also allow the user to select a steeping time for the tea (e.g., 2 min., 3 min., 4 min., etc.). The user interface 160 may further include LED indicators to indicate the selections and brewing status.

Figure 2:
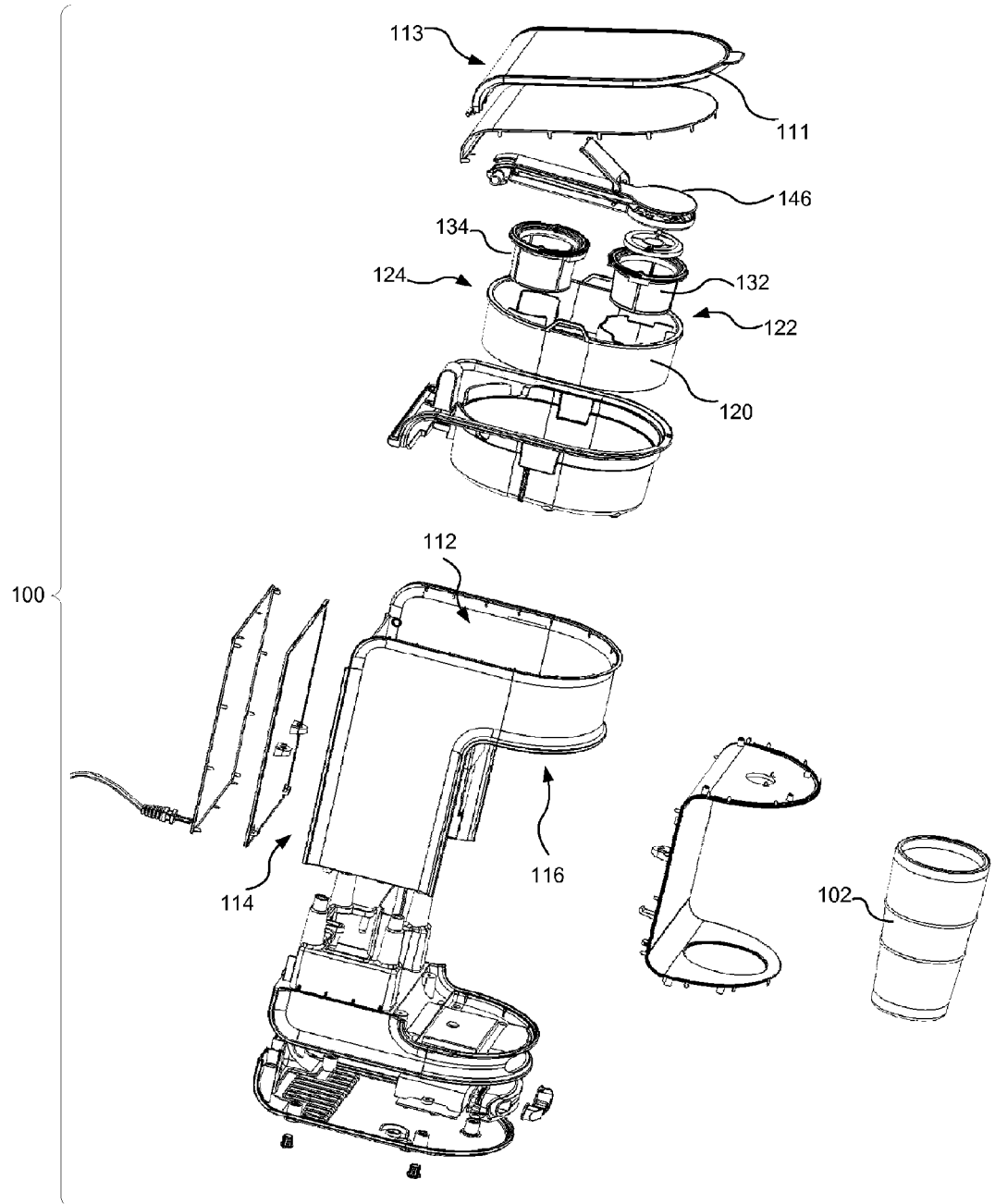
FIG. 2 is an exploded perspective view of the combined coffee and tea brewing apparatus shown in FIG. 1.

The coffee and tea brewing basket 120 is removably located in the brewing region 112 and includes a coffee brewing section 122 and a tea brewing section 124 (FIG. 2). The coffee and tea brewing basket 120 may be positioned within the brewing region 112 in a coffee brewing position (shown in FIGS. 1-11) for brewing coffee, or alternatively, in a tea brewing position for brewing tea. The coffee brewing section 122 is configured to receive a reusable coffee filter 132 and the tea brewing section 122 is configured to receive a reusable tea filter 134, as will be described in greater detail below.

Figure 3:
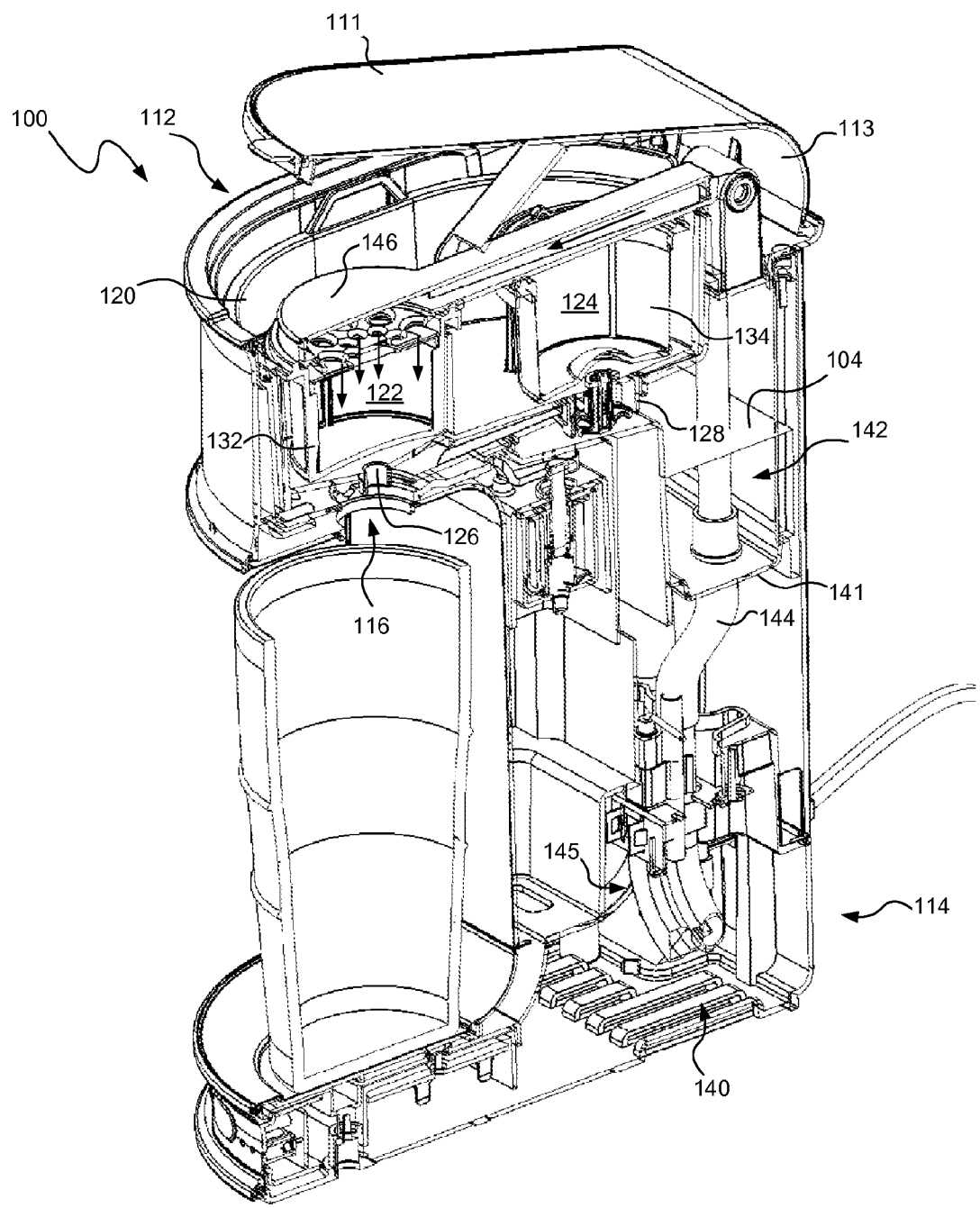
FIG. 3 is a side, cross-sectional view of the combined coffee and tea brewing apparatus shown in FIG. 1.
Figure 5:
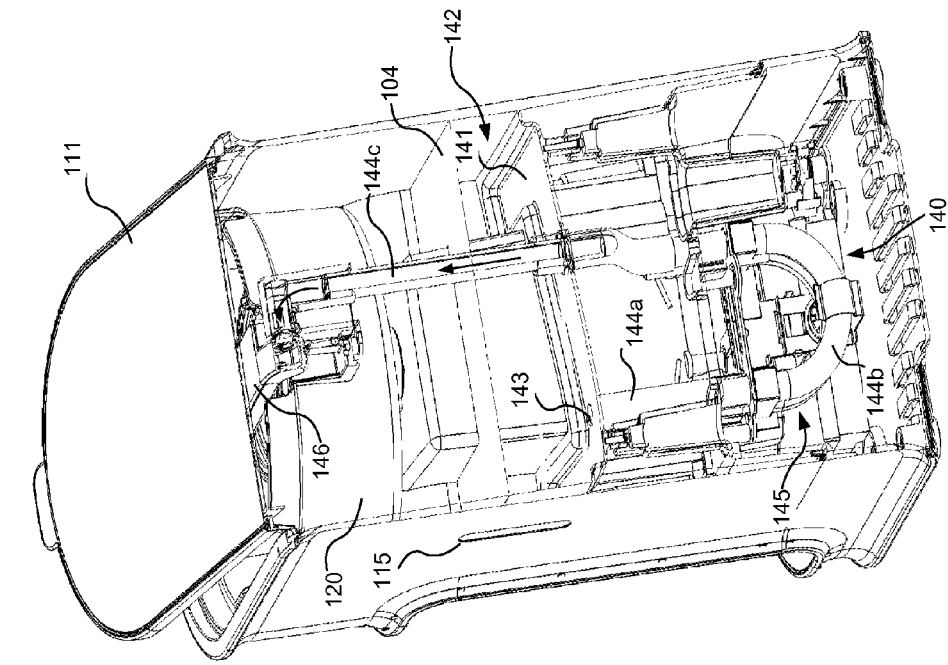
FIGS. 4 and 5 are cross-sectional views illustrating the hot water supply system in the combined coffee and tea brewing apparatus shown in FIG. 1.
Figure 4:
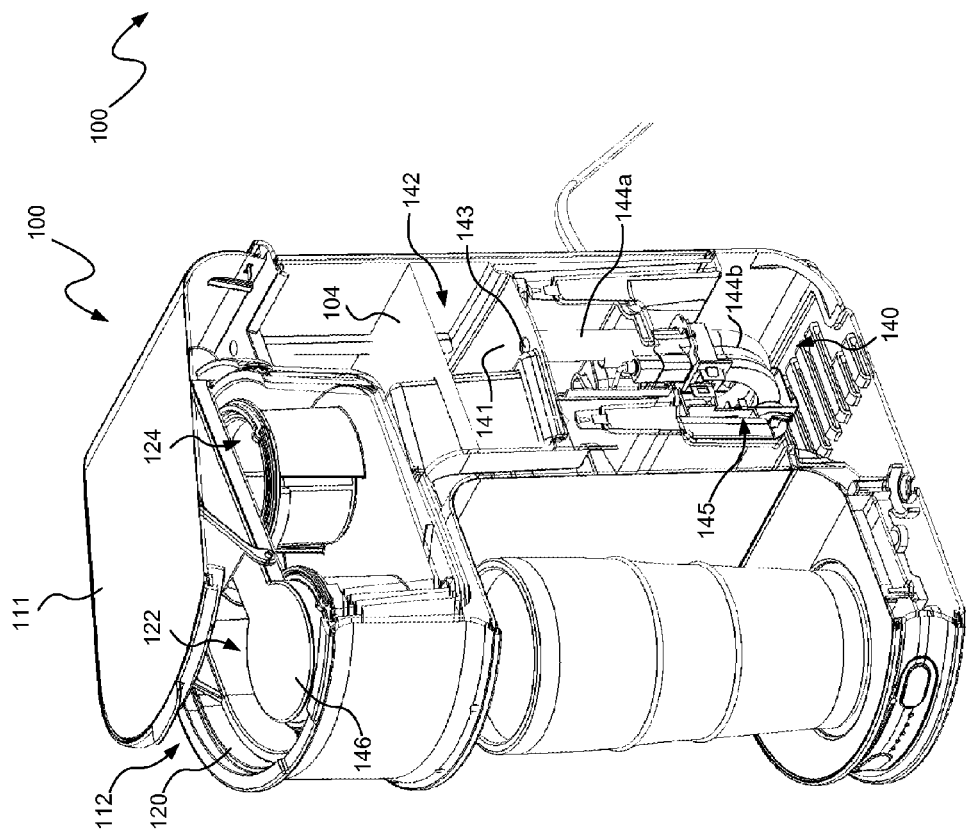

Referring to FIGS. 3-5, the hot water delivery system 140 is described in greater detail. The hot water delivery system 140 includes a reservoir 142 for holding water 104 and a conduit 144 that directs the water from the reservoir 142 to a brewing arm 146. The brewing arm 146 is also hinged at one end and coupled to the lid 111 such that the brewing arm 146 is raised when the lid 111 is raised and fluidly coupled to one of the filters 132, 134 in a brewing position when the lid 111 is closed. The reservoir 142 is formed within the housing 110 and accessible through the top of the housing 110 when the lid 111 is opened for filling the reservoir 142. The reservoir 142 may have a capacity capable of holding a sufficient quantity of water for at least an individual serving of coffee or tea (e.g., about 13.5 oz). The water level window 115 is located in the housing 110 adjacent the reservoir 142 to allow a user to observe the level of water in the reservoir 142 (FIG. 5). The back of the housing 110 may also include one or more overfill drain holes that allow water to drain out the back of the housing 110 when the reservoir 142 is overfilled.

The reservoir 142 is defined by a floor 141, which may be slanted to allow water to flow to a drain 143 fluidly coupled to a first portion 144a of the conduit 144. The water flows from the first portion 144a of the conduit 144 to a second portion 144b, which is thermally coupled to a heating element 145 for heating the water in the second portion 144b of the conduit 144. The heating of the water in the second portion 144b of the conduit 144 causes the water to rise through a third portion 144c of the conduit 144 to the brewing arm 146. The brewing arm 146 then passes the hot water into the filter that is in the brewing position and fluidly coupled to the brewing arm 146. Thus, the hot water delivery system 140 operates to deliver hot water without using a pump in a manner that is the same as or similar to conventional techniques used in coffee machines. Other types of hot water delivery systems may also be used.

Figure 3A:
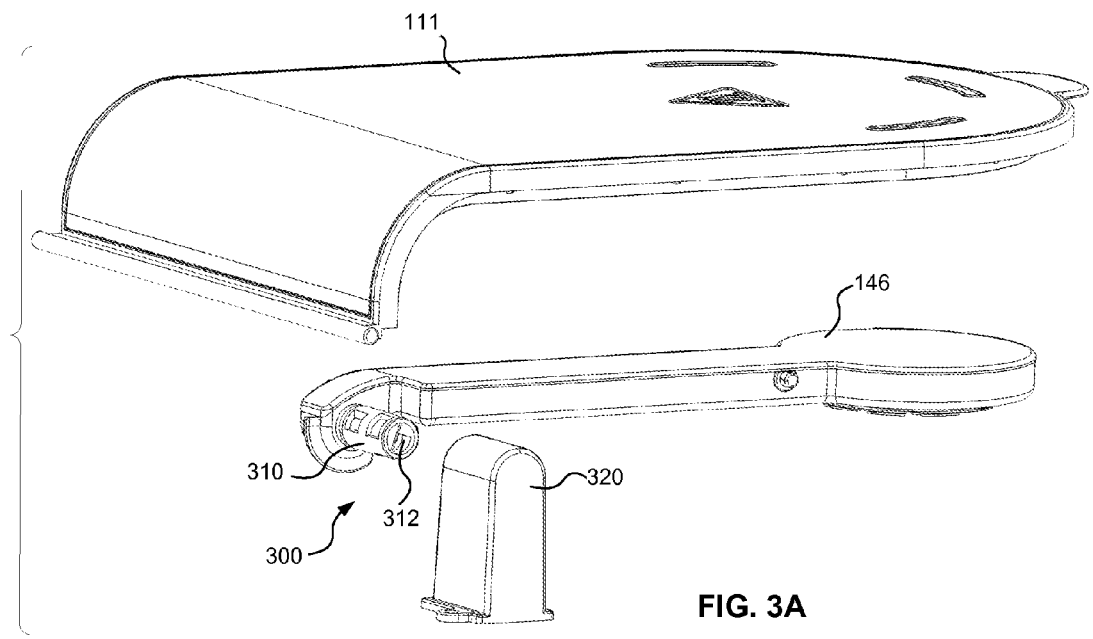
FIG. 3A is an exploded perspective view of a steam restriction hinge for pivotably and fluidly coupling a brewing arm in the combined coffee and tea brewing apparatus shown in FIG. 1.
Figure 3B:
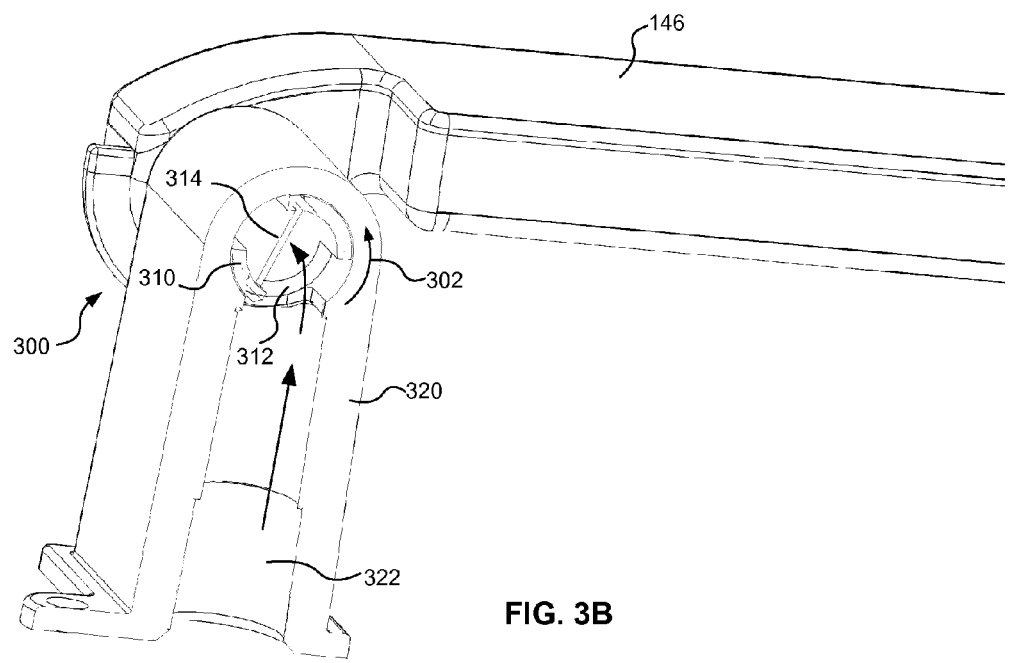
FIG. 3B is a cross-sectional view of the steam restriction hinge shown in FIG. 3A.

In the illustrated embodiment, the brewing arm 146 has a shower head design with multiple holes that distribute the hot water across the filter 132, 134 in the brewing position. As shown in greater detail in FIGS. 3A and 3B, one embodiment of the brewing arm 146 is pivotably coupled and fluidly coupled to the hot water delivery system 140 with a steam restriction hinge 300. The steam restriction hinge 300 includes a rotating portion 310 that extends from the brewing arm 146 and rotates within a fixed portion 320, which is fluidly coupled to the conduit 144 (not shown in FIGS. 3A and 3B). The rotating portion 310 includes an opening 312 that is fluidly coupled to a passageway 322 in the fixed portion 320 when the brewing arm 146 is lowered in the brewing position (as shown in FIG. 3B). The rotating portion 310 also includes a wall 314 that closes off the passageway 322 when the rotating portion 310 rotates in the direction of arrow 302 as the brewing arm 146 is raised. Thus, the steam restriction hinge 300 allows the hot water to pass through the brewing arm 146 when the brewing arm 146 is lowered to the brewing position and restricts the hot water and/or steam when the brewing arm 146 is raised with the lid 111 to the open position. Although one embodiment is shown, other hinge configurations are contemplated to allow hot water to flow through in one position and to block hot water and/or steam in another position.

Referring to FIGS. 6-9, the coffee and tea brewing basket 120 is described in greater detail. As mentioned above, the brewing basket 120 includes a coffee brewing section 122 configured to receive a reusable coffee filter 132 and a tea brewing section 124 configured to receive a reusable tea filter 134. The brewing basket 120 also includes one or more handles 121 for removing the brewing basket 120 from the housing 110. Although separate handles 121 are shown on each side, a single handle may extend from one side to the other side of the brewing basket 120.

In the illustrated embodiment, a cover 133 is used with the coffee filter 132, which retains the coffee grinds and allows the hot water to pass through. A coffee spout 126 is located in the brewing basket 120 below the coffee brewing section 122 to allow the brewed coffee to be dispensed through the dispensing region 116 in the housing 110 and into the container 102. Thus, coffee is brewed by passing the hot water continuously through the coffee grinds contained in the coffee filter 132 and through the coffee spout 126.

For brewing tea, the brewing basket 120 defines a chamber 125 that receives and holds the hot water while the tea leaves contained in the tea filter 134 are allowed to steep in the hot water. The chamber 125 may have a volume capable of holding a sufficient quantity of hot water to brew an individual serving of tea. A wall 123 surrounds the coffee brewing section 122 to prevent the hot water from passing into the coffee brewing section 122 while steeping tea. A tea spout 128 is located in the brewing basket 120 below the tea brewing section 124 to allow the brewed tea to be dispensed through the dispensing region 116 in the housing 110 and into the container 102. A valve 138 is located in the tea spout 128 to hold the hot water in the chamber 125 until the tea has steeped for a period of time. The valve 138 is actuated to release the tea through the tea spout 128. Thus, tea is brewed by passing the hot water through the tea leaves in the tea filter 134, allowing the hot water to remain in the chamber 125 for sufficient time to brew the tea, and then passing the brewed tea through the tea spout 128.

Figure 6:
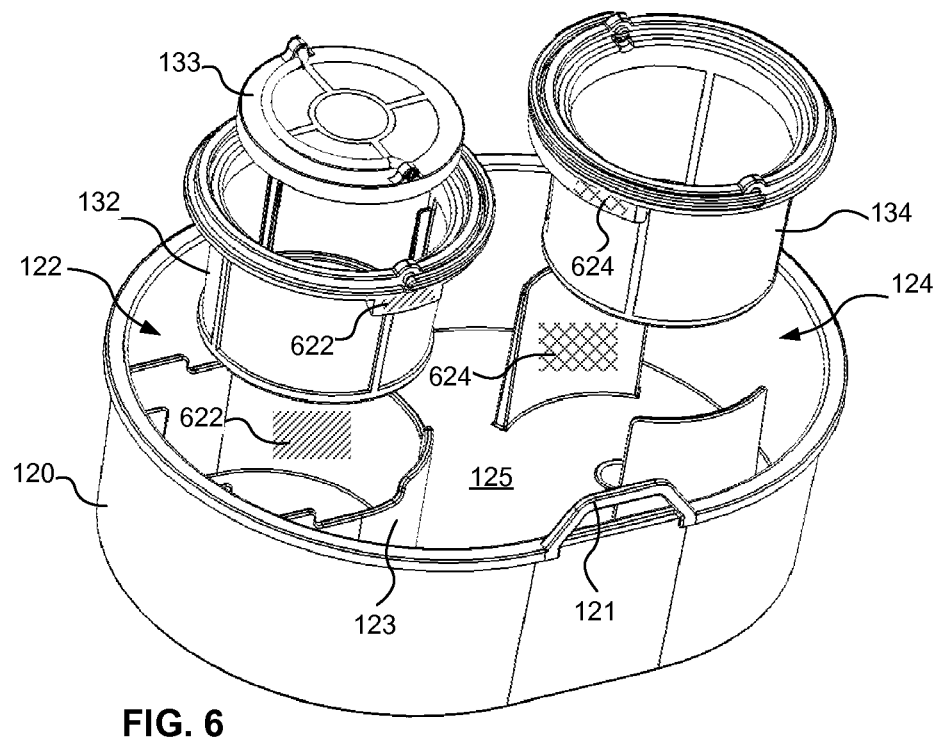
FIG. 6 is an exploded view of a coffee and tea brewing basket assembly used in the combined coffee and tea brewing apparatus shown in FIG. 1.
Figure 7:
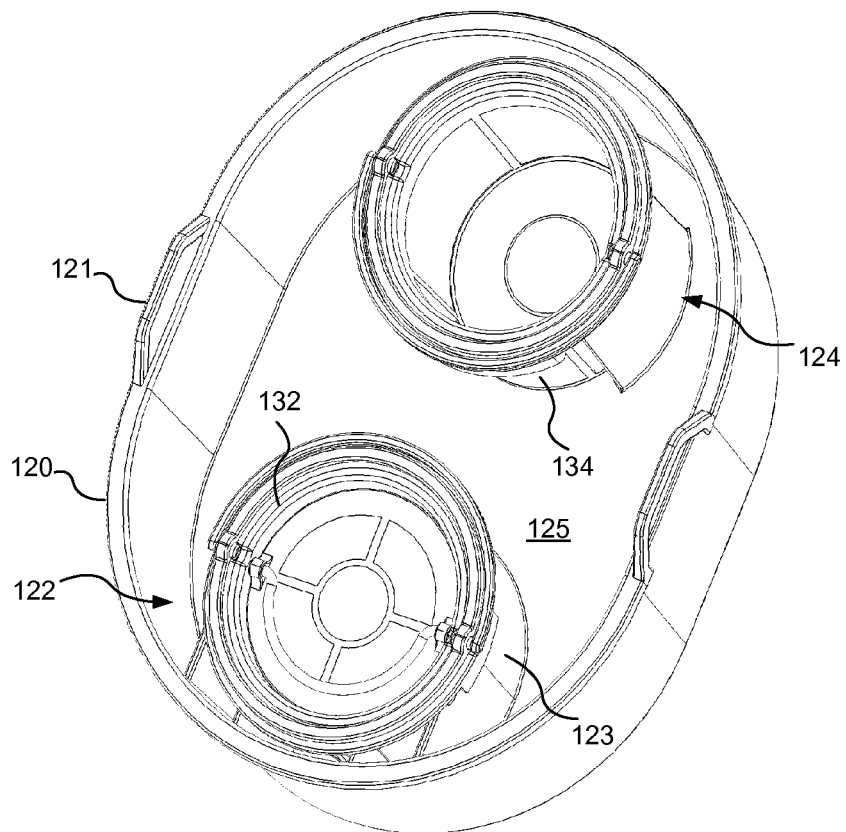
FIG. 7 is a top perspective view of the coffee and tea brewing basket assembly shown in FIG. 6.
Figure 8:
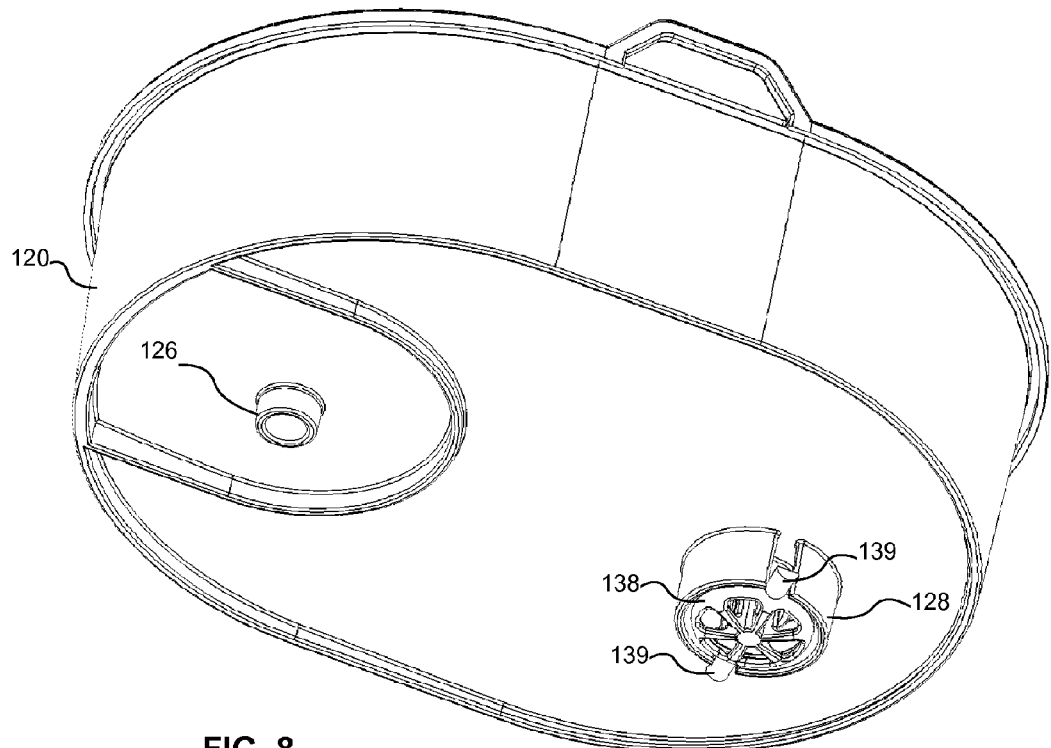
FIG. 8 is a bottom perspective view of the coffee and tea brewing basket assembly shown in FIG. 6.
Figure 9:
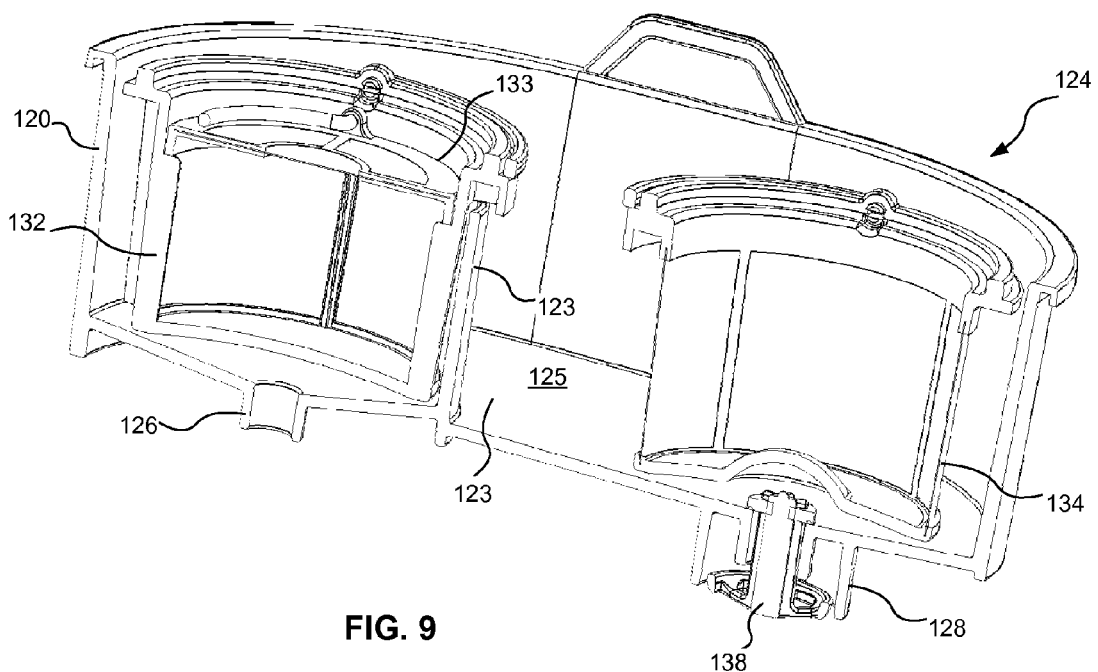
FIG. 9 is a side, cross-sectional view of the coffee and tea brewing basket assembly shown in FIG. 6.

The brewing basket 120 may also include indicia in the respective brewing sections 122, 124 to indicate the type of beverage. The indicia may include, for example, different colors on all or a portion of the respective sections 122, 124. As shown in FIG. 6, for example, the coffee brewing section 122 may include one color 622 on the walls enclosing the coffee brewing section 122 and the tea brewing section 124 may include a different color 624 on the walls enclosing the tea brewing section 124. The coffee filter 132 and the tea filter 134 may also include corresponding colors 622, 624 matching the respective coffee brewing section 122 and tea brewing section 124.

Although the illustrated brewing basket may be used in the coffee and tea brewing apparatus 100 for brewing coffee and tea, a similar brewing basket may also be used to brew other varieties of beverages. The brewing basket may be designed with two or more tea brewing sections for brewing different types or flavors of tea or with two or more coffee brewing sections for brewing different types or flavors of coffee. The brewing basket may also be designed with brewing sections for other types of beverages. The brewing basket may further be designed with more than two brewing sections.

Figure 11:
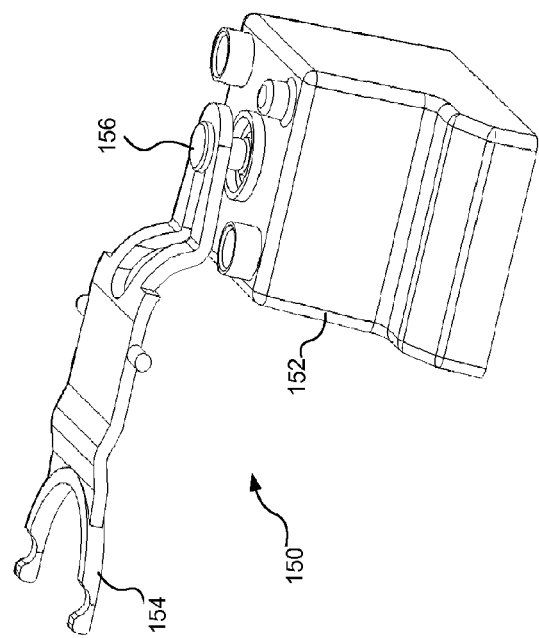
FIG. 11 is an enlarged perspective view of the tea brewing release mechanism shown in FIG. 10.
Figure 10:
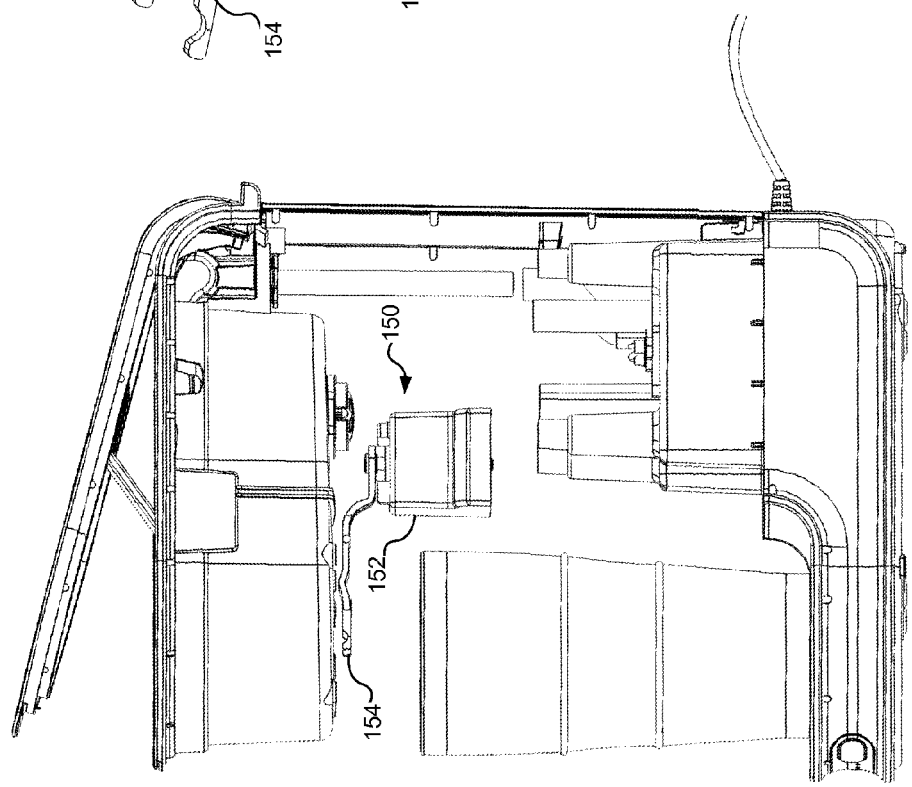
FIG. 10 is a side, cross-sectional view illustrating the tea brewing release mechanism in the combined coffee and tea brewing apparatus shown in FIG. 1.

Referring to FIGS. 10 and 11, a tea brewing release mechanism 150 is shown and described in greater detail. The tea brewing release mechanism 150 includes a relay 152 coupled to a release arm 154, which engages the valve 138. FIG. 10 shows the brewing basket 120 in a coffee brewing position and thus does not show the release arm 154 engaging the valve 138. In the tea brewing position (not shown), the release arm 154 engages the arms 139 extending from the valve 138 (see FIG. 8). The release arm 154 is coupled to an actuator 156 of the relay 152, which is moved linearly by the relay 152 to cause the release arm 154 to move and force open the valve 138. The relay 152 may include a solenoid or other similar mechanisms for causing linear motion in response to an electrical signal. Other types of valves may also be used and other mechanisms may be used to open the valve to release the brewed tea.

Figure 12:
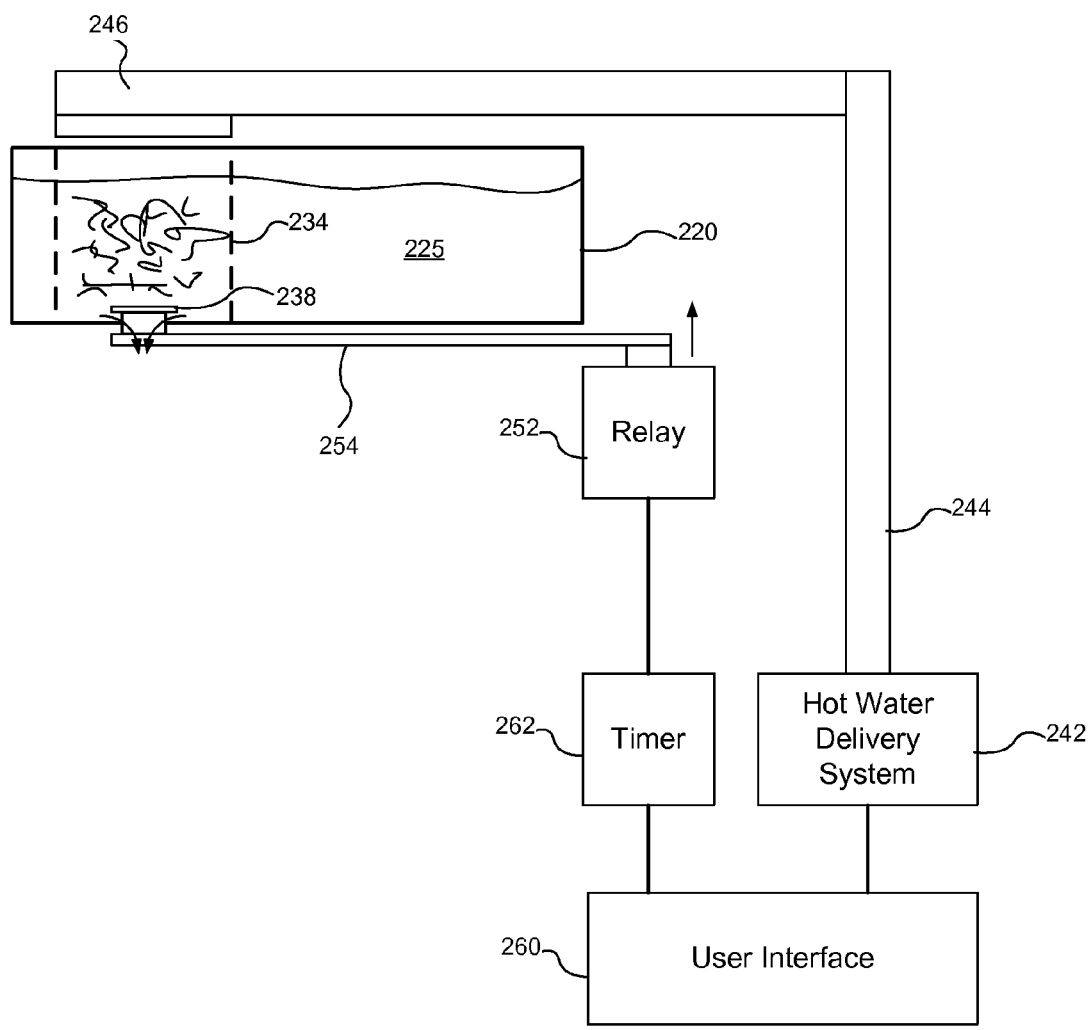
FIG. 12 is a schematic view an embodiment of a tea brewing system used in the combined coffee and tea brewing apparatus.

FIG. 12 illustrates an embodiment of a tea brewing system consistent with the present disclosure. A user interface 260 may include user controls for starting and stopping a brewing process by starting and stopping a hot water delivery system 242. The user interface 260 may also include user controls for selecting a tea brewing or steeping time by setting a timer 262. After the user selects a tea brewing time and starts the brewing, the timer 262 is activated for the selected period of time and the hot water delivery system 242 delivers hot water through a conduit 244 and a brewing arm 246 to a tea filter 234 located in a brewing basket 220. A valve 238 in the brewing basket 220 remains closed as the hot water fills a chamber 225 in the brewing basket 220, allowing the tea leaves in the tea filter 234 to steep in the hot water. A relay 252 will then cause a release arm 254 to open the valve 238 in response to expiration of the selected period of time at the timer 262.

Accordingly, a combined multiple beverage brewing apparatus, consistent with embodiments disclosed herein, is capable of brewing an individual serving of different beverages, such as coffee or tea, using reusable filters and without mixing flavors of the different beverages.

Consistent with an embodiment, a multiple beverage brewing apparatus including a housing defining a water delivery region, a brewing region and a dispensing region. The multiple beverage brewing apparatus also includes a brewing basket configured to be removably positioned within the brewing region of the housing. The brewing basket has at least first and second brewing sections. The first brewing section is configured to receive a first brewing material and the second brewing section being configured to receive a second brewing material. The brewing basket also includes at least first and second dispensing spouts in the at least first and second brewing sections, respectively. The brewing basket is configured to be positioned such that either the first dispensing spout or the second dispensing spout is aligned with the dispensing region of the housing. The brewing basket further includes a valve located in at least one of the dispensing spouts to prevent dispensing a beverage until the valve is actuated. The multiple beverage brewing apparatus further includes a hot water delivery system within the water delivery region of the housing. The hot water delivery system is configured to heat water and deliver hot water to either the first brewing section or the second brewing section of the brewing basket.

Consistent with another embodiment, a combined coffee and tea brewing apparatus includes a housing defining a water delivery region, a brewing region and a dispensing region. The combined coffee and tea brewing apparatus also includes a brewing basket configured to be removably positioned within the brewing region of the housing. The brewing basket has a coffee brewing section configured to receive coffee grinds and a tea brewing section configured to receive tea leaves. The brewing basket includes a coffee dispensing spout in the coffee brewing section and with a tea dispensing spout in the tea brewing section. The brewing basket is configured to be positioned such that either the coffee dispensing spout or the tea dispensing spout is aligned with the dispensing region of the housing. The brewing basket further includes a valve located in the tea dispensing spout to prevent dispensing tea until the valve is actuated. The combined coffee and tea brewing apparatus further includes a hot water delivery system within the water delivery region of the housing. The hot water delivery system is configured to heat water and deliver hot water to either the coffee brewing section or the tea brewing section of the brewing basket.

Consistent with a further embodiment, a multiple beverage brewing basket including: a first brewing section including a first dispensing spout; a first reusable filter configured to be removably positioned in fluid communication with the first dispensing spout; a second brewing section including a second dispensing spout and a valve located in the second dispensing spout to prevent dispensing a second beverage until the valve is actuated; and a second reusable filter configured to be removably positioned in fluid communication with the second dispensing spout.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multiple beverage brewing apparatus comprising:
a housing defining a water delivery region, a brewing region and a dispensing region;
a brewing basket configured to be removably positioned within the brewing region of the housing in at least first and second different brewing positions, the brewing basket having at least first and second brewing sections, the first brewing section being configured to receive a first brewing material and the second brewing section being configured to receive a second brewing material, wherein the brewing basket includes at least first and second dispensing spouts in the at least first and second brewing sections, respectively, wherein the brewing basket is configured such that the first dispensing spout is aligned with the dispensing region in the first brewing position to allow a beverage to pass through the first dispensing spout and the dispensing region in the first brewing position and such that the second dispensing spout is aligned with the dispensing region in the second brewing position to allow a beverage to pass through the second dispensing spout and the dispensing region in the second brewing position, wherein the brewing basket further includes a valve located in at least one of the dispensing spouts to prevent dispensing a beverage until the valve is actuated; and a hot water delivery system within the water delivery region of the housing, the hot water delivery system being configured to heat water and deliver hot water to either the first brewing section or the second brewing section of the brewing basket.

2. The multiple beverage brewing apparatus of claim 1 wherein the brewing basket is configured to hold a quantity of water corresponding to an individual serving.

3. The multiple beverage brewing apparatus of claim 1 wherein the brewing basket is configured to hold a quantity of water corresponding to multiple servings.

4. The multiple beverage brewing apparatus of claim 1 wherein at least one of the first and second brewing sections include indicia for indicating a type of brewing material to be deposited therein.

5. The multiple beverage brewing apparatus of claim 4 wherein the indicia includes different colors.

6. The multiple beverage brewing apparatus of claim 1 further comprising at least first and second reusable filters configured to be removably positioned in the first and second brewing sections, respectively of the brewing basket and in fluid communication with the first and second dispensing spouts, respectively.

7. The multiple beverage brewing apparatus of claim 1 further comprising:
a lid pivotably coupled to the housing with a hinge for covering the brewing region, wherein the lid has an arcuate portion proximate the hinge to facilitate flow of water from condensation back into the housing.

8. The multiple beverage brewing apparatus of claim 1 further comprising a brewing release mechanism operably coupled to the valve, wherein the brewing release mechanism is configured to actuate the valve after a period of time selected by a user.

9. The multiple beverage brewing apparatus of claim 1 further comprising a brewing arm pivotably coupled to the housing and fluidly coupled to the hot water delivery system such that the brewing arm directs hot water to either the first brewing section or the second brewing section of the brewing basket.

10. The multiple beverage brewing apparatus of claim 9 wherein the brewing arm is pivotably and fluidly coupled using a steam restriction hinge, wherein the steam restriction hinge is configured to allow hot water to pass into the brewing arm when lowered in a brewing position and wherein the steam restriction hinge is configured to block steam when the lid and the brewing arm are raised to an open position.

11. The multiple beverage brewing apparatus of claim 1 wherein at least one of the brewing sections has a volume of at least about 6 fluid ounces such that at least an individual serving of a beverage is allowed to steep before the valve is actuated.

12. A combined coffee and tea brewing apparatus comprising:
a housing defining a water delivery region, a brewing region and a dispensing region;
a brewing basket configured to be removably positioned within the brewing region of the housing in at least a coffee brewing position and a tea brewing position, the brewing basket having a coffee brewing section configured to receive coffee grinds and a tea brewing section configured to receive tea leaves, wherein the brewing basket includes a coffee dispensing spout in the coffee brewing section and with a tea dispensing spout in the tea brewing section, wherein the brewing basket is configured such that the coffee dispensing spout is aligned with the dispensing region in the coffee brewing position to allow a coffee beverage to pass through the coffee dispensing spout and the dispensing region in the coffee brewing position and such that the tea dispensing spout is aligned with the dispensing region in the tea brewing position to allow a tea beverage to pass through the tea dispensing spout and the dispensing region in the tea brewing position, wherein the brewing basket further includes a valve located in the tea dispensing spout to prevent dispensing tea until the valve is actuated; and
a hot water delivery system within the water delivery region of the housing, the hot water delivery system being configured to heat water and deliver hot water to either the coffee brewing section or the tea brewing section of the brewing basket.

13. The combined coffee and tea brewing apparatus of claim 12 further comprising:
a reusable coffee filter configured to be removably positioned in the coffee brewing section of the brewing basket in fluid communication with the coffee dispensing spout; and
a reusable tea filter configured to be removably positioned in the tea brewing section of the brewing basket in fluid communication with the tea dispensing spout.

14. The combined coffee and tea brewing apparatus of claim 12 further comprising:
a lid pivotably coupled to the housing with a hinge for covering the brewing region, wherein the lid has an arcuate portion proximate the hinge to facilitate flow of water from condensation back into the housing.

15. The combined coffee and tea brewing apparatus of claim 12 further comprising a tea brewing release mechanism operably coupled to the valve, wherein the tea brewing release mechanism is configured to actuate the valve after a period of time selected by a user.

16. The combined coffee and tea brewing apparatus of claim 12 wherein the brewing basket is configured to hold a quantity of water corresponding to an individual serving.

* * * * *